ELECTRONIC LINE CIRCUIT FOR CODE SIGNALING SYSTEM

Filed Nov. 7, 1960 2 Sheets-Sheet 1

INVENTORS
LEONARD LAMIN
VICTOR HABISOHN
BY J. Warren Whitesel
ATTORNEY

Oct. 2, 1962 L. LAMIN ET AL 3,056,856

ELECTRONIC LINE CIRCUIT FOR CODE SIGNALING SYSTEM

Filed Nov. 7, 1960 2 Sheets-Sheet 2

3,056,856
ELECTRONIC LINE CIRCUIT FOR CODE SIGNALING SYSTEM

Leonard Lamin, Chicago, and Victor J. Habisohn, Oaklawn, Ill., assignors to International Telephone and Telegraph Corporation, New York, N.Y., a corporation of Maryland Filed Nov. 7, 1960, Ser. No. 67,631
17 Claims. (Cl. 178—69)

This invention relates to line circuits for use in connection with electrical code signaling systems and more particularly to line circuits for use in connection with a testing or monitoring position.

In electrical code signaling systems (such as "Teletypewriter" systems), information may be sent over a line that interconnects distant points. To maintain the signaling system, it is necessary to provide a station or position where the line may be tested, monitored, or otherwise supervised. Thus, maintenance personnel at such a station may be fully informed as to the condition of the line at all times and may take any action necessary to correct fault conditions as they occur.

To give the maintenance personnel access for monitoring, testing, or supervising the line, a "line circuit" is connected in the line intermediate the ends thereof. During monitor conditions, the line may be either on "standby" as indicated by a closed D.C. loop or carrying a message consisting of coded open loop pulses. During testing, these same conditions may be found; or, the line may be open (no D.C. loop) or noisy (randomly recurring open loop conditions). In any event, equipment associated with the line circuit must recognize and indicate the condition of the line to the maintenance personnel. Moreover, such equipment must also provide safeguards which prevent the maintenance personnel from interfering with the line while a message is on it, while allowing a normal access to an idle line or an overriding access to a busy line.

These and other similar functions have been performed by electromagnetic switching equipment; however, such equipment has obvious disadvantages since the inertia of moving parts constitutes an inherent limitation that prevents increased switching speed. Moreover, the wear of moving mechanical parts presents maintenance and adjustment problems.

Accordingly, it is an object of this invention to provide new and improved electrical code signaling systems, and more particularly, to provide electronic line circuits for use in connection with such systems. A more particular object is to provide means for indicating whether changes in electrical conditions on a line result from signal or noise conditions. A further object is to provide normal access for monitoring or testing the electrical conditions of the line if no message is on the line at the time of access while allowing an overriding access to monitor or test busy lines.

Another object of this invention is to overcome the limitations of electromagnetic switching systems through the use of electronic components. In this connection, it is an object to provide a highly reliable line circuit giving maintenance personnel complete access to and control over electrical code signaling lines extending between distant points.

In accordance with one aspect of this invention, the winding of a glass reed relay is connected in series with one conductor of a line extending between distant signaling points. An electronic logic circuit controlled by contacts on the relay analyzes voltage changes occurring on the line by measuring each period of time during which the contacts are open. If the contacts reclose within a predetermined time period (such as 170 milliseconds), it is an indication that a message is being transmitted over the line. On the other hand, if the contacts do not reclose within the predetermined time period, it is an indication of either noise or trouble on the line. If the contacts remain closed continuously, the line is on standby and if the contacts remain open continuously, there is trouble. The logic circuit controls a lamp bank which displays information relating to the condition of the line to maintenance personnel.

The above mentioned and other features and objects of this invention and the manner of obtaining them will become more apparent, and the invention itself will be best understood by reference to the following description of an embodiment of the invention taken in conjunction with the accompanying drawings wherein.

Figure 2:
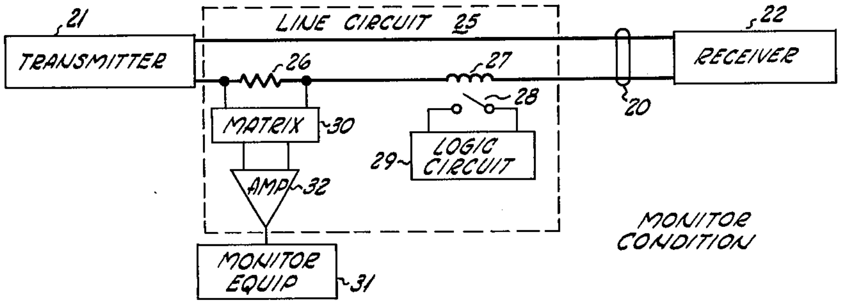
FIG. 2 shows the system of FIG. 1 with equipment connections used during monitor conditions.
Figure 3:
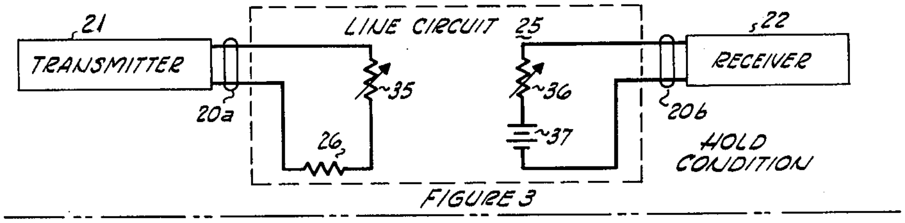
FIG. 3 shows the system of FIG. 1 with the signal transmission line broken to provide a hold condition.
Figures 4, 5:
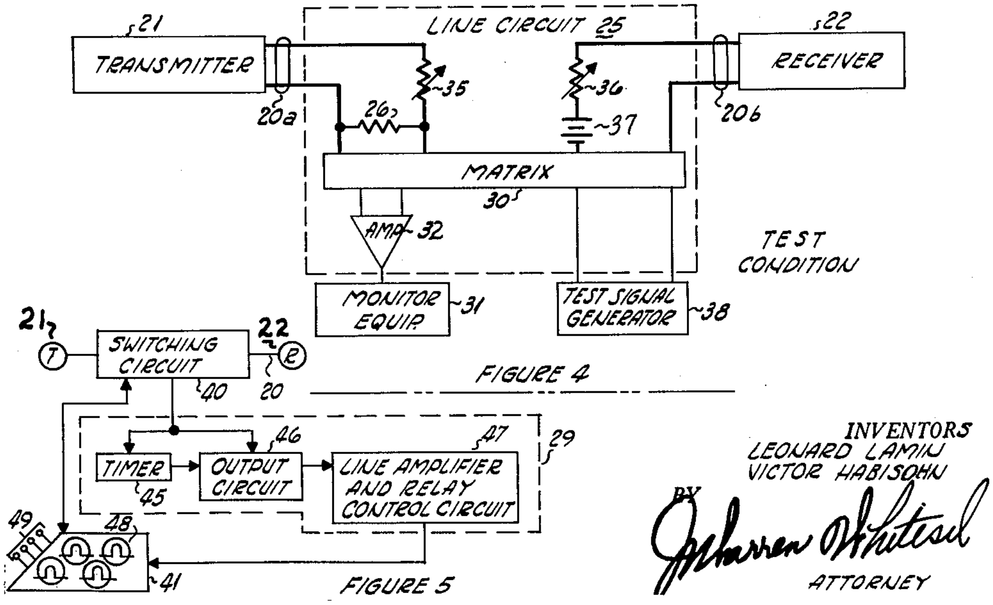
FIG. 4 shows the system of FIG. 1 with equipment connections used during test conditions.
Figure 6:
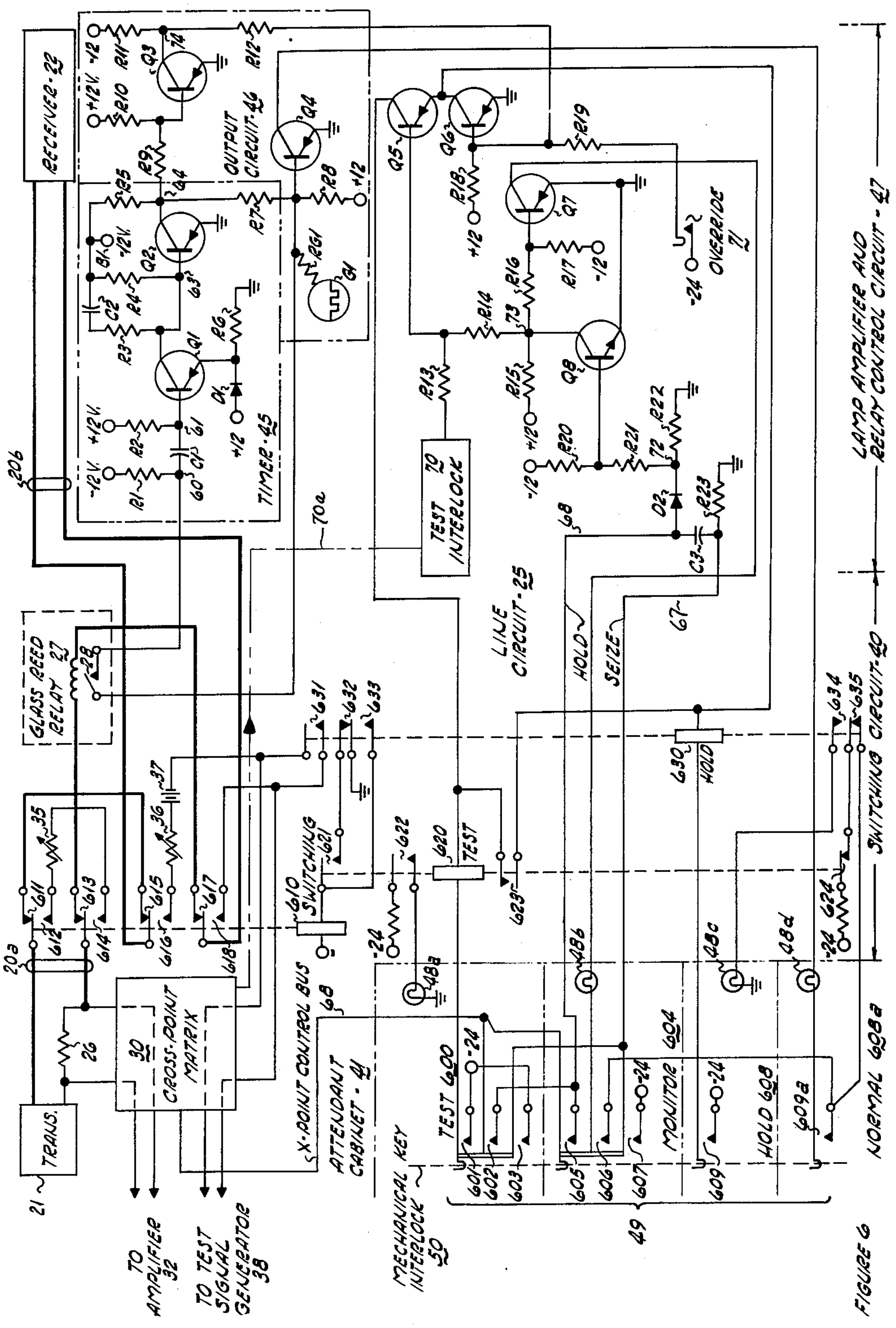

FIG. 5 a block diagram showing the major component parts of the line circuit that is enclosed by dot-dashed lines in FIGS. 1–4; and FIG. 6 is a schematic circuit diagram of the circuitry used to complete the block diagram of FIG. 5.

*General Description*

An exemplary electrical code signaling system made in accordance with this invention is depicted by the block diagrams of FIGS. 1–4. As there shown, a line 20 (the heavily inked conductors) interconnects any suitable electrical code signaling equipment 21, 22 located at two or more distant points. The signaling equipment 21, 22 is shown as hollow boxes designated "transmitter" and "receiver," respectively, since their exact nature is not material to the invention. For example, they may include a "Teletypewriter" transmitter or receiver, a telegraph key, an automatic device such as a perforated tape sender or receiver, telemetering instrumentation, or the like.

In general, this signaling equipment transmits open loop pulses, i.e. each bit of information sent over the line 20 consists of a steady state D.C. potential selectively interrupted in accordance with a preselected binary code. Assuming that the standard commercial "Teletypewriter" code is used, each symbol transmitted over the line conductors 20 includes six possible open loop pulses comprising a synchronizing pulse followed by five binary coded information pulses. Each pulse lasts 22 milliseconds. Assuming that all five information pulses are open pulses, the longest period during which D.C. battery is removed from the line conductors is six successive open loop pulses or 132 milliseconds. Therefore, if the line is open for a much longer period of time (such as 170 milliseconds) it is an indication of trouble. The exact time period is, of course, arbitrary and may change from system to system.

A line circuit 25 is connected to the line intermediate its ends for giving test or monitoring equipment access to the line. Among other things, the line circuit includes means (here shown as resistor 26) for developing signals which vary in accordance with code signals sent from the transmitter 21 to the receiver 22. The voltage drop across resistor 26 may be used to drive monitor equipment. Also included in the line circuit is a glass reed relay 27 having a winding connected in series with one line conductor. A characteristic of the glass reed relay which makes it particularly attractive for this application is that it does not offer any substantial impedance to the flow of current over the line 20. It should be obvious, however, that other similar devices may be substituted therefor. Contacts 28 of the glass reed relay 27 open each time that an open loop signal appears on the line. An electronic logic circuit 29 is energized by the contacts 28 each time that they close. Equipment in logic circuit 29, which measures each period of time during which contacts 28 are opened, gives an indication of trouble at the end of the measured period. In this manner, a trouble signal is not given if contacts 28 reclose within the maximum time period that is normally encountered during code pulsing.

As best shown in FIG. 2, a monitor condition may be established when maintenance personnel operates a switching matrix 30 to interconnect the signal developing resistor 26 and monitor equipment 31 via amplifier 32. The matrix 30, monitor equipment 31, and amplifier 32 all may have a conventional form. For example, the matrix 30 may use glass reed relays in the manner shown in FIGS. 3–5 of U.S. Patent 2,962,557 granted November 29, 1962, to Radcliffe et al. and assigned to the assignee of this invention. It should be noted that the matrix 30 gives the monitor equipment access to any line served by the maintenance personnel—it does not switch signaling circuits between transmitter 21 and various receivers. As here shown, the transmitter 21 is permanently connected to the receiver 22 via line 20. If switching is required, any suitable central office equipment may be included in the circuit designated generally by line 20.

To establish hold conditions, as shown in FIG. 3, the line 20 is broken into "send" section 20*a* and "receive" section 20*b*, thus preventing transmission from the transmitter 21 to the receiver 22. The "send" section 20*a* is terminated by a characteristic impedance 35. To avoid having the receiver 22 run open, the receive section 20*b* is terminated by its characteristic impedance, here shown as a resistor 36, and by a battery 37 having the same potential as that which is normally applied by the transmitter 21 to the receiver 22 during idle conditions.

After a hold condition is established, maintenance personnel may perform tests in any well known manner. As depicted in FIG. 4, the monitor equipment 31 is connected to the send line section 20*a* via matrix 30 and amplifier 32, as explained above in connection with FIG. 2. A test signal generator 38 is connected in series with the line through the matrix 30 to send a test message to the receiver 22, thus testing the receive section 20*b* of the line. No attempt has been made in FIGS. 2 and 4 to show details of the monitor equipment or test generator 31, 38 since these items are well known to those skilled in the art. For example, they may include a "Teletypewriter," oscilloscopes, meters, or the like for the monitor and a relay contact or an electronic switch for the test generator.

In each of these described conditions, the maintenance personnel charged with the preservation of a trouble-free transmission line is given access to the line 20 via the line circuit 25 shown in the block diagram of FIG. 5. As there shown, the line 20 extending between the distant points 21, 22 is connected through a switching circuit 40. The switching circuit 40 operates in a first manner to extend the line 20 between the transmitter 21 and the receiver 22 during normal and monitor conditions. When the switching circuit 40 operates in a different manner, the line 20 is split into "send" and "receive" sections as shown by FIGS. 3 and 4.

The logic circuit 29 includes as principal components, a timer 45, an output circuit 46, and a lamp amplifier and relay control circuit 47. Each time that the glass reed relay 27 closes contacts 28 (FIGS. 1 and 2), timer 45 (FIG. 5) starts to measure a period of time. If signals are transmitted through the winding of relay 27 fast enough, the timer 45 does not time-out. On the other hand, if the signals do not operate relay 27 fast enough, timer 45 does time-out. Depending upon a selective operation of keys 49 and whether timer 45 times-out, different control signals are transmitted from output circuit 46 through circuit 47 to give indications of the condition of the line 20 at lamp bank 48.

*Detailed Description*

It is thought that the principles of the invention may be understood best by making reference to the schematic circuit diagram of FIG. 6 which shows the circuitry used to fill the hollow blocks of FIG. 5. More specifically, the transmitter and receiver, 21, 22 are shown in the upper left-hand and right-hand corners of FIG. 6 respectively and the line 20 is shown by heavily inked conductors extending therebetween. Intermediate the ends of the line 20 is the switching circuit 40 which includes a switching relay 610, a test relay 620, and a hold relay 630. These relays are selectively controlled by the keys 49 on a panel board of the attendant's cabinet 41. The attendant's cabinet 41 also includes the bank of lamps 48 which are lit to indicate the result of each test as it is conducted.

The logic circuit 29 includes the electronic components shown in the remainder of FIG. 2, which are: the timer 45, the output circuit 46, and the lamp amplifier and relay control circuit 47. Each of these electronic circuits includes, as major components, a number of semi-conductor devices which may assume any well known form. As here shown, each of the devices Q1–Q7 is a junction-type PNP transistor and the device Q8 is a junction-type NPN transistor. Each of the transistors Q1–Q4 functions as a simple "off" and "on" electronic switch. The transistors Q5–Q8 amplify various signals to provide the power required to operate relays in switching circuit 40 and to light lamps 48.

*Timer circuit 45*.—Means are provided, in the form of timer circuit 45, for measuring a predetermined period of time following each occurrence of a signal pulse on the line 20. More specifically, the major components of the timer circuit include the cascaded transistors Q1, Q2 and a timing circuit including the capacitor C2 and resistor R4. The base biasing circuit for transistor Q1 includes a voltage divider which is the series circuit including a pair of resistors R1, R2 separated by a capacitor C1 and connected between −12 volts and +12 volts. The capacitor C1 gives D.C. isolation between the base of transistor Q1 and battery applied through resistor R1. Thus, if contacts 28 are opening and closing, the charging current flows from −12 volts through resistor R1 to make point 61 negative; and if contacts 28 remain open or closed, capacitor C1 charges fully, charging current ceases to flow, and point 61 is at +12 volts. The emitter bias for transistor Q1 is applied over the circuit including diode D1 and resistor R6 which is connected between ground and +12 volts. The diode D1 and resistor R6 form a voltage divider which applies about +11½ volts to the emitter of transistor Q1. Since the base is normally at +12 volts applied through resistor R2, transistor Q1 is normally switched "off." The diode D1 is used since the current drawn through it when transistor Q1 switches "on" does not cause an IR voltage drop, hence the emitter voltage remains at a steady +11½ volts. Resistor R3 limits current flow while capacitor C2 charges and prevents a short to battery B1 when current surges.

In normal conditions when contacts 28 are not pulsing, transistor Q1 is switched "off," current then flows through the emitter base junction of transistor Q2 and resistor R4 to the −12 volt potential of battery B1 thereby switching transistor Q2 "on." Resistors R5, R7 and R8 form a voltage divider connected between −12 and +12 volts. When transistor Q2 switches "on," the voltage divider including resistors R7 and R8 is effectively connected between ground at point 64 and +12 volts.

Hence, a negative potential is applied to the base of transistor Q4 when the transistor Q2 is "off" and a positive potential is applied when transistor Q2 is "on."

The purpose of the timer 45 is to apply ground at point 64 if the D.C. loop is closed or if the D.C. loop remains open longer than 170 milliseconds, and to remove ground during normal message pulsing. In greater detail, when contacts 28 are in a steady state (either opened or closed) capacitor C1 charges fully and point 60 is either at −12 volts applied through resistor R1 or at a potential established by a voltage divider including resistors R1, R8. The point 61 is at +12 volts applied through resistor R2 and transistor Q1 is switched "off." Normally, therefore, the base of transistor Q2 is at the negative potential of battery B1 and its collector point 64 is at the emitter ground potential.

If the contacts 28 are pulsing at a normal speed capacitor C1 is charging and discharging thus switching transistor Q1 "off" and "on." Each time that transistor Q1 switches "on" +11½ volts are applied through diode D1, and the emitter-collector of transistor Q1 to change the potential point 63 from negative to positive polarity and switch transistor Q2 "off," thus removing the ground potential at point 64. Also capacitor C2 is charged through resistor R3. When transistor Q1 switches "off," capacitor C2 starts to discharge through resistors R3, R4 to hold the positive potential at point 63 and thus hold transistor Q2 "off." The resistor R3 is relatively small so that capacitor C2 charges quickly and the resistor R4 is relatively large so that capacitor C2 discharges slowly. Thus, as long as pulses reappear on line 20 at a normal rate of speed, capacitor C2 does not discharge fully, transistor Q2 remains "off" and point 64 is at the potential established by the voltage divider including resistors R5, R7 and R8.

If the contacts 28 remain open longer than 170 milliseconds, capacitor C2 discharges fully, point 63 goes negative, and transistor Q2 switches "on," thus applying its emitter ground to point 64.

*Output circuit 46*.—Means are provided for selectively giving any of a number of output signals depending upon the condition of the line 20 as interpreted by the logic circuit 29. In greater detail, these signals emanate from the output circuit 46 which includes a pair of transistors Q3, Q4 that are driven from either timer circuit 45 or a blinking generator G1. The generator G1 may be any suitable device, such as a free-running multivibrator, which cyclically biases the base of transistor Q4 between negative and ground potential through resistor RG1, thus switching it "on" and "off."

When contacts 28 close, −12 volts are applied through resistor R1 and contacts 28 to the base of transistor Q4, thus switching it "on" and holding it "on" despite the changing voltage emanating from generator G1. Also, when transistor Q2 switches "off" negative battery B1 is applied through resistors R5, R7 to seize control of transistor Q4. If transistor Q2 switches "on" point 64 goes to ground potential and the blinking generator G1 regains control of transistor Q4. Thus, the emitter ground on transistor Q4 appears at its collector if the contacts 28 are closed or are pulsing at a rate which closes the contacts within 170 milliseconds. If the contacts 28 are open for a time period greater than 170 milliseconds, the output of transistor Q4 is switched "off" and "on" at the rate set by the blinking generator G1.

Transistor Q3 is switched "on" when transistor Q2 is "off" and switched "off" when transistor Q2 is switched "on." More specifically, when transistor Q2 is "off," the base of transistor Q3 is made negative relative to its emitter by the voltage divider R5, R9, R10 connected between −12 volt and +12 volt batteries. When transistor Q2 is "on," the base of transistor Q3 is made positive relative to its emitter by the voltage divider R9, R10 connected between ground at point 64 and a +12 volt battery. Thus, the emitter ground on transistor Q3 appears at point 74 only when normally coded pulses appear on line 20.

From the foregoing, it is apparent that the voltages emanating from the output circuit 46 are as follows:

| Condition of Line | Contacts 28 | Output of Transistor Q3 | Output of Transistor Q4 |
|---|---|---|---|
| Closed loop | Closed | Off | Steady. |
| Open loop | Open | Off | Blinking. |
| Normal code pulses | Pulsing | On | Steady. |
| Noisy line | Slow pulsing | Off | Blinking. |

*Lamp amplifier and relay control circuit 47*.—The lamp amplifier and relay control circuit 48 includes transistors Q5–Q8, a test interlock circuit 70, and an override key 71. The test interlock circuit 70 is designed to prevent the line from being split until the matrix 30 has switched through, thus preventing an open loop condition which might otherwise cause the receiver 22 to run open. The dashed line 70*a* indicates a matrix control over the interlock circuit 70. The way of accomplishing this control is not material; if the matrix of the Radcliffe et al. patent (2,962,557) is used, the matrix control may be accomplished by the Radcliffe et al. allotter advance circuit. In any event, the interlock 70 applies a positive potential through resistor R13 in any suitable manner if the matrix 30 has not completed its switching function. If the matrix 30 has switched through negative potential is applied from circuit 70 through resistor R13. As will become more apparent, the override key 71 allows transistor Q6 to switch "on" responsive to a manual control and without regard to the condition of line 20 to make seizure of the line possible during normal code pulsing.

The remaining components of the control circuit 47 include a voltage divider comprising resistors R20—R22 connected in series between −12 volts and ground to provide the base bias for transistor Q8. The circuit values are such that NPN transistor Q8 is normally switched "off" when so biased. Resistors R15—R17 form a second voltage divider connected between +12 volts and −12 volts to establish a biasing potential at the base of the transistor Q7. If transistor Q8 is "off" the point 73 is biased from either the interlock circuit 70 or from +12 volts. With this arrangement transistor Q7 is hold "off" unless a crosspoint in matrix 30 is closed and a positive voltage is applied to point 72, causing transistor Q8 to turn "on" bringing point 73 to ground, thereby allowing transistor Q7 to switch "on." Transistor Q7 functions to control the monitor lamp 48*b*.

Means are provided in the circuit 47 for controlling the operation of a crosspoint switch in matrix 30. This means includes a seize conductor 67 for operating the crosspoint matrix 30 and a hold conductor 68 for holding and releasing a crosspoint in matrix 30. These may be the "seize" and "hold" conductors of the Radcliffe et al. patent. A capacitor C3 is connected between the seize and hold conductors 67, 68 to time the application of a seize potential to operate a crosspoint in the matrix 30 when a key 49 is operated. The resistor R23 is connected between ground and one plate of the capacitor to discharge it. Diode D2 provides a uni-directional path for the flow of holding current and a resistor R22 limits hold current flow and provides the positive potential required to switch transistor Q8 "on." In this manner, a high negative potential is applied over seize conductor 67 and hold conductor 68 to operate a crosspoint in matrix 30 when either the test or monitor key in group 49 is operated. Thereafter, the operated crosspoint returns positive potential over hold conductor 68.

In carrying out this invention, the maintenance personnel are positively prevented from accidentally cutting in on a busy line carrying normally coded messages. More specifically, to switch into the line, it is necessary to operate the test relay 610; and to operate the relay 610, it is necessary to operate the test relay 620, or the hold relay 630. To operate relay 620 it is necessary for collector current to flow through the transistor Q5 and transistor Q6. During normally coded messages, transistor Q3 is "on" and point 74 is at ground potential. Thus, the base of transistor Q6 cannot be made negative by battery applied through resistor R11, and transistor Q6 is switch "off." With transistor Q6 switched "off," no current can flow from ground on its emitter through transistor Q5 to energize the relay 620. If the matrix 30 is switched through test interlock circuit 70 applies a negative potential to switch "on" transistor Q5 but if override key 71 is open, transistor Q6 is "off," and there is no effective path from ground on the emitter of transistor Q6 through the collector of transistor Q5 to operate test relay 620. In a similar manner, if override key 71 is pushed at a time when the matrix is not switched through, test interlock circuit 70 is applying a positive potential to the base of transistor Q5 which is switched "off" and there is no effective circuit from the emitter ground of transistor Q7 to the test relay 620.

To allow an overriding access to busy lines, the test interlock circuit 70 and the override key 71 form an "and" circuit which allows access to the line when the operator exercises a deliberate manual control. In greater detail, if override key 71 is operated simultaneously with an application of a negative potential from test interlock circuit 70 to the base of transistor Q5, both transistors switch "on" and a circuit is completed from ground on the emitter of transistor Q6 through the collector of transistor Q5 to energize test relay 620. Thereafter, contacts 621 close to operate switching relay 610 via the contacts 632, thus operating contacts 611—618 to break the line 20 and connect suitable monitor or test equipment to the line sections 20*a* and 20*b*.

*Circuit operation.*—It is thought that the invention may be better understood by the following description of the manner in which the switching circuit 40 operates under the control of the logic circuit 29 and during various conditions which may be encountered when the maintenance personnel selectively operate the keys 49 to monitor or to perform tests on the line.

Figure 1:
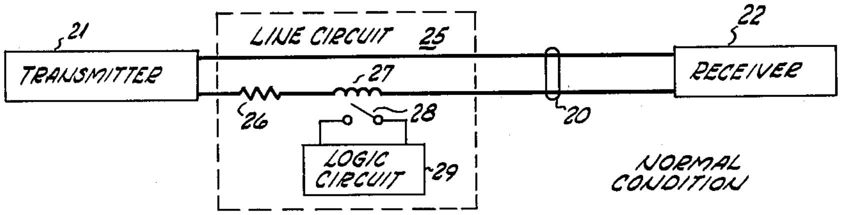
FIG. 1 is a block diagram showing an electrical code signaling system including a line circuit made in accordance with this invention, the diagram indicating a normal condition.

Normally, as shown in FIG. 1, the conductors of line 20 interconnect transmitter 21, receiver 22 with the circuit being completed through contacts 611, 613, 615 and 617 of switching relay 610 (FIG. 6). During quiescent or standby conditions when no message is on the line, a steady state D.C. potential is connected across the line conductors by transmitter 21.

Glass reed relay 27 is energized continuously by such steady state D.C. potential; therefore, contacts 28 remain closed. With contacts 28 closed, the base of transistor Q1 is positive relative to its emitter and the base of transistor Q4 is negative relative to its emitter. Thus, transistors Q1 and Q4 are switched "off" and "on" respectively. With transistor Q1 "off," transistor Q2, Q6 are "on," and transistor Q3 is "off."

If the "normal" key 608*a* is pushed, the "normal" lamp 48*d* is lit continuously over the circuit traced from ground through transistor Q4, the filament of lamp 48*d* and contacts 609*a*, 635 and 624 to —24 volt battery.

*Holding.*—Means are provided for holding the line. More specifically, the maintenance personnel notes the condition of lamp 48*d* and pushes the "hold" key 608 to seize the line 20. A mechanical interlock 50 prevents operation of more than one key at a time; therefore, key 608*a* releases. Responsive to the closure of contacts 609, —24 volts is applied to the left-hand side of the winding of hold relay 630 and ground is applied through the emitter-collector circuit of transistor Q6 to the right-hand side of the winding of relay 630 which operates to close contacts 631 thus preparing a holding loop for the receive line 20*b*. Contacts 632 open without effect and contacts 633 close to apply a ground that operates switching relay 610 in an obvious manner. Contacts 635 open without effect and contacts 634 close to light "hold" lamp 48*c* as an indication that the line is being held. The lamp circuit may be traced from ground through the filament of lamp 48*c*, contacts 634 and 624 to —24 volts. A resistor is included in this circuit to limit surge current through lamp 48*d* and transistor Q6. Responsive to the operation of switching relay 610, contacts 611—618 operate, thus breaking the connection between the line sections 20*a* and 20*b* at contacts 611, 613, 615 and 617. Contacts 612, 614, 616 and 618 close to apply the terminating impedance 35 across the send line section 20*a* and to apply resistor 36 and battery 37 across the receive line section 20*b*. The battery 37 simulates the steady state standby D.C. battery normally applied over line 20 from transmitter 21 to receiver 22.

An advantage of this invention is that the line 20 cannot be held in the described manner if a normally coded message is being sent. That is, the operation of relay 630 depends upon conductivity of the transistor Q6. If a message is on the line, point 74 is at ground potential and transistor Q6 is "off" unless the override key 71 is pushed. If no message is on the line —12 volts is applied across resistor R11 and through point 74 to switch transistor Q6 "on."

In the condition described, the line 20 has been split and holding bridges have been applied to the transmit and the receive sections 20*a*, 20*b* (as shown in FIG. 3). The crosspoint matrix 30 has not switched through and nothing further happens.

*Monitoring.*—Means are provided for monitoring the line when the monitor key 604 is pushed. That is, the mechanical interlock 50 opens hold key contacts 609, thereby releasing hold relay 630 and, in turn, extinguishing hold lamp 48*c*. When hold relay 630 releases contacts 633 open, thereby restoring the switching relay 610 and returning the contacts 611—618 to their normal condition. The line is switched through from the transmitter 21 to the receiver 22.

In carrying out this invention, the matrix is interlocked to prevent the extension of two or more calls simultaneously to the monitor or test equipment. When the monitor key is operated, contacts 607 close to apply —24 volts across capacitor C3 which charges and causes a negative voltage pulse to be transmitted over hold conductor 68, contacts 605 and the crosspoint control bus to operate a switch in matrix 30 and to extend a connection from line 20*a* through an amplifier 32 to monitor equipment. After the crosspoint in matrix 30 closes, test interlock circuit 70 applies a negative potential through resistor R13 to the base of transistor Q5 which switches "on" without effect since contacts 601 on test key 600 are open. An important advantage of this arrangement is that the test interlock prevents all other lines from going into the test or monitor condition until the initial operation of the matrix has been completed. Ground on transistor Q7's emitter is applied through its collector to the filament of lamp 48*b*, contacts 606, 635 and 624 to negative battery. Lamp 48*b* lights as an indication that the line is in monitor condition.

After contacts (not shown) in matrix 30 close, positive voltage is returned from the closed crosspoint switch over the crosspoint control bus 68, through the diode D2 and resistor R22 to a holding ground. As long as positive potential is returned through diode D2, point 72 is at a positive potential and the NPN transistor Q8 is switched "on"; and with transistor Q8 "on," transistor Q7 is turned "on" through the voltage divider R16, R17. With transistor Q8 "on," ground is applied to point 73 to hold transistor Q7 "on."

The circuit is now in the condition shown in FIG. 2. Each pulse sent over line 20 by the transmitter 21 causes a change in the IR drop across resistor 26 which, in turn, causes the monitor 31 to respond and reproduce the transmitted message.

If the person operating the keys so desires, monitor key 604 is opened to remove the monitor connection and return the line to the condition shown in FIG. 1. At such time, contacts 607 open to remove the −24 volt battery which was applied through capacitor C3 originally to operate the crosspoint matrix 30; capacitor C3 discharges through resistor R23 to ground. Contacts 606 open to extinguish the monitor lamp 48*b*. Contacts 605 open the hold bus extending from the crosspoint matrix, thus releasing the connection to the monitor 31. When current no longer flows through the diode D2 to make point 72 positive, transistor Q8 switches "off" because the voltage drop across resistors R21, R22 makes the base negative relative to the emitter. When transistor Q8 switches "off," point 73 goes to the positive potential applied through resistor R15 and by the interlock circuit 70 when the crosspoint opens. The transistors Q5, Q7 switch "off," and the circuit is returned to the normal condition.

*Testing.*—Means are provided for testing the line when the person operating the keys pushes key 600 to conduct a test. Responsive to the closure of the test key contacts 603, −24 volts is applied over conductor 67 to operate a crosspoint switch in matrix 30. With the interlock circuit 70 going negative when the crosspoint operates and the collector of transistor Q8 going to ground, there is an "and" logic function which switches transistor Q5 "on." After a crosspoint in matrix 30 operates, the "send" line section conductors are switched through to a monitor and test signal generator as shown by FIG. 4.

A circuit is completed from −24 volts through contacts 601, the winding of test relay 620, and the collector-emitter circuits of transistors Q5, Q6 to ground, after the transistor Q5 is switched "on" by the "and" circuit specified above, and if the transistor Q6 is not switched "off" by a mesage on the line. When the test relay 620 operates, contacts 621 close, thereby connecting the switching relay 610 to ground on contact 632. Relay 610 operates its contacts 611—618 to split the line, as shown in FIG. 4. Contacts 622 close to light lamp 48*a* over an obvious circuit as an indication that a test is in progress. Contacts 623 close a locking circuit for the test relay 620 through the collector-emitter circuit of transistor Q6. Contacts 624 open a point in the circuits to lamps 48*b*—48*d*.

The difference between the control exercised by the test and monitor keys 600, 604 is that switching relay 610 is held operated throughout the test condition to maintain the split line as shown in FIG. 4 whereas operation of the monitor key allows the line 20 to be switched through from the transmitter 21 to the receiver 22 as shown by FIG. 2. When the test key 600 is returned to normal, the circuit returns to normal condition.

It is to be understood that the foregoing description of a specific example of the invention is not to be considered as a limitation on its scope.

We claim:

1. An electrical code signaling system comprising a line interconnecting distant points, a line circuit connected to said line intermediate said distant points, means comprising a switching device in said line circuit for giving access to said line, means in said line circuit for detecting voltage changes occurring on said line, means controlled by said detecting means for analyzing said voltage changes to determine whether they are coded signals or are noise, and means responsive to said analyzing means for allowing operation of said switch means if noise occurs on said line.

2. The code signaling system of claim 1 wherein said means for analyzing said voltage changes comprises means for detecting conditions wherein said voltage changes do not recur within predetermined time limits.

3. The code signaling system of claim 1 and means responsive to detection of the voltage changes that indicate noise for giving an indication thereof.

4. The code signaling system of claim 1 and means responsive to detection of the voltage changes that indicate the code signals for preventing operation of said switching device to preclude accidentally cutting in on said line.

5. A code signaling system comprising a line interconnecting distant points, a line circuit connected to said line intermediate said distant points, means comprising a switching device in said line circuit for giving access to said line, means in said line circuit for detecting open and closed loop conditions on said line, means also in said line circuit for timing open loop signals transmitted between said distant points over said line, means controlled by said timing means for signalling a noise condition when said timed open loop signals exceed a predetermined period of time, and means responsive to said timing means for allowing operation of said switching means if noise occurs on said line.

6. The code signaling system of claim 5 wherein said means for signaling a noise condition is rendered effective by said timing means when said signals do not recur within 170 milliseconds.

7. A code signaling system comprising a line interconnecting distant points, means for monitoring coded signals transmitted over said line, a line circuit connected to said line intermediate said distant points for giving said monitoring means access to said line, means in said line circuit for detecting voltage changes occurring on said line, means controlled by said detecting means for analyzing said voltage changes to determine whether they are said coded signals or are noise, and means controlled by said analyzing means for preventing the connection of said monitoring means to said line if coded signals are detected on said line.

8. An electrical code signaling system comprising a line for interconnecting distant points, test and monitor equipment, switching means intermediate the ends of said line for interconnecting the line with said test and monitor equipment, an attendant's cabinet including manually controlled test applying means and result of test indicating means, means including a relay in series with said line for operating or releasing responsive to changes of electrical conditions on said line, means including an electronic logic circuit energized by contacts of said relay for analyzing the changing conditions occurring on said line, and means responsive to said last named means for selectively operating said result of test indicating means.

9. The code signaling system of claim 8 wherein said analyzing means comprises an electronic switch, means comprising said contacts of said relay for applying a biasing potential via a capacitor to turn said electronic switch "off" and "on," whereby said capacitor partially charges and discharges when said contacts pulse at greater than a predetermined rate and said capacitor completely charges when said contacts pulse at less than a predetermined rate, means responsive to charging current extended through said capacitor for switching said switch to one "off" or "on" state, and means responsive to an absence of charging current for switching said switch to a second "off" or "on" state, whereby said switch is turned "off" or "on" as a function of the rate at which said contacts pulse.

10. The code signaling system of claim 9 and a second capacitor, means for charging said second capacitor each time that said switch is switched to a first of said two states and for discharging said second capacitor each time that said switch is switched to the other of said two states, said charging time for said second capacitor being such that said second capacitor charges fully each time that said switch switches to said first state, said discharging time for said second capacitor being such that said second capacitor discharges over a predetermined time period which exceeds the repetition rate of said coded signals, and means for barring connection of said test and monitoring equipment to said line unless said second capacitor fully discharges.

11. A code signaling system comprising a code signaling transmitter, a code signaling receiver, a line including a pair of conductors for interconnecting said transmitter and said receiver, switching means intermediate the ends of said line for interconnecting the line with test and monitor equipment, means including a relay in series with said line for operating and releasing responsive to voltage changes occurring on said line, means energized by contacts of said relay for timing said voltage changes, means responsive to said last named means for indicating a trouble condition if said voltage changes do not recur within a predetermined time period, and means for preventing said switching means from being accidentally operated if said voltage changes recur within said predetermined time period.

12. An electronic line circuit for use in an electrical code signaling system, said line circuit comprising, in combination, switching means for selectively extending a line between distant points or for splitting said line into send and receive sections, means including test or monitor equipment connected to said line via said switching means when said line is split, means for preventing said line from being accidentally split when a message is on said line, and means for overriding said last named means to give said test or monitor equipment access to busy lines responsive to a deliberate operation of a manual control device.

13. The electronic line circuit of claim 12 wherein said means for preventing said line from being accidentally split comprises means for timing each electrical code signal transmitted over said line, means for disabling said splitting means when said signals recur at greater than a predetermined rate, and means responsive to said timing means for enabling said splitting means when said signals recur at less than a predetermined rate.

14. The electronic line circuit of claim 13 wherein said timing means comprises a relay operated and released responsive to each of said code signals, an electronic switch, means comprising contacts on said relay for applying a biasing potential via a capacitor to control said switch, whereby said capacitor partially charges and discharges when said contacts pulse at greater than a predetermined rate and said capacitor completely charges when said contacts pulse at less than a predetermined rate, means responsive to charging current extended through said capacitor for switching said switch to one "off" or "on" state, and means responsive to an absence of charging current for switching said switch to a second "off" or "on" state.

15. The electronic line circuit of claim 14 and a second capacitor means for charging said second capacitor each time that said switch is switched to a first of said two states and for discharging said capacitor each time that said switch is switched to the other of said two states, said charging time for said second capacitor being such that said second capacitor charges fully each time that said switch switches to said first state, said discharging time for said second capacitor being such that said second capacitor discharges over a predetermined time period which exceeds the repetition rate of said coded signals, and said means for enabling said splitting means comprises means rendered effective after said predetermined time period by said discharge of said second capacitor.

16. A code signaling system comprising a line interconnecting distant points, test and monitor equipment, a line circuit connected to said line intermediate said distant points for giving said test and monitor equipment access to said line, means in said line circuit for splitting said line into send and receive sections and for extending said line sections to said test and monitor equipment, means for interlocking said last named means to prevent the simultaneous extension of two or more calls to said test and monitor equipment, means in said line circuit for detecting open and closed loop conditions on said send section line, means also in said line circuit for timing said open loop signals on said line, and means controlled by said timing means for signaling a noise condition when said open loop time signals do not end within a predetermined period of time.

17. A code signaling system comprising a switching matrix, a line for extending calls between distant points, an electronic line circuit for giving said matrix access to said line, said line circuit comprising switching means for selectively extending said line between said distant points or for splitting said line into send and receive sections and for extending said sections to said switching matrix, means for testing said line including test or monitor equipment connected to said line sections via said switching matrix when said line is split, means for interlocking said line circuit and said switching matrix to prevent simultaneous extension of two or more calls from said line to said test or monitor equipment, means for preventing said line from being accidentally split when a message is on said line, and means including said interlock means for overriding said last named means to give said test or monitor equipment access to busy lines responsive to a deliberate operation of a manual control device.

References Cited in the file of this patent

UNITED STATES PATENTS 2,938,077 Holland et al. ---------- May 24, 1960